United States Patent

[11] 3,604,404

| [72] | Inventor | Dean L. Pitchford<br>New Castle, Ind. |
|---|---|---|
| [21] | Appl. No. | 820,418 |
| [22] | Filed | Apr. 30, 1969 |
| [45] | Patented | Sept. 14, 1971 |
| [73] | Assignee | Dana Corporation<br>Toledo, Ohio |

[54] ANTI-OVERRIDE MECHANISM
2 Claims, 3 Drawing Figs.

[52] U.S. Cl............................................. 123/102,
74/470, 123/98, 180/109
[51] Int. Cl........................................F02d 11/10,
B60k 31/00, G05q 1/00
[50] Field of Search........................................ 123/102,
98; 74/470; 180;109

[56] References Cited
UNITED STATES PATENTS

| 2,402,724 | 6/1946 | Bidwell................. | 74/470 |
|---|---|---|---|
| 2,625,838 | 1/1953 | Dillard.................. | 74/470 |
| 2,638,082 | 5/1953 | Dillard.................. | 74/470 |
| 2,822,881 | 2/1958 | Treharne............... | 123/102 |
| 2,842,110 | 7/1958 | Eddy, Jr................ | 123/102 |
| 2,911,077 | 11/1959 | Carter, Jr............... | 123/102 |
| 2,940,330 | 6/1960 | Parsons................. | 74/470 |
| 2,973,051 | 2/1961 | Teetor.................. | 123/102 |
| 2,987,054 | 6/1961 | Eddy, Jr................ | 123/102 |
| 3,168,942 | 2/1965 | Thorner................ | 74/470 |
| 3,188,878 | 6/1965 | Chelminshi et al..... | 74/470 |
| 2,090,246 | 8/1937 | Alexander............. | 74/470 |
| 3,146,471 | 9/1964 | Edmondson........... | 74/470 |
| 2,972,390 | 2/1961 | Bunker et al.......... | 180/109 |
| 3,109,507 | 11/1963 | McMurray et al...... | 180/109 |

*Primary Examiner*—Wendell E. Burns
*Attorneys*—Richardson B. Farley, Walter E. Pavlick, Harold D. Shall and John F. Teigland ABSTRACT: A structurally encapsulated assembly is disclosed which provides override for a speed control unit so that throttle advance by the vehicle operator, once set speed is reached, has no effect on the setting provided for the engine by the speed control unit. The encapsulated assembly is attached, at its one end to a cable connecting means extending to the speed control unit, at its other end to the pedal operated linkage and, therefore, is in series between them.

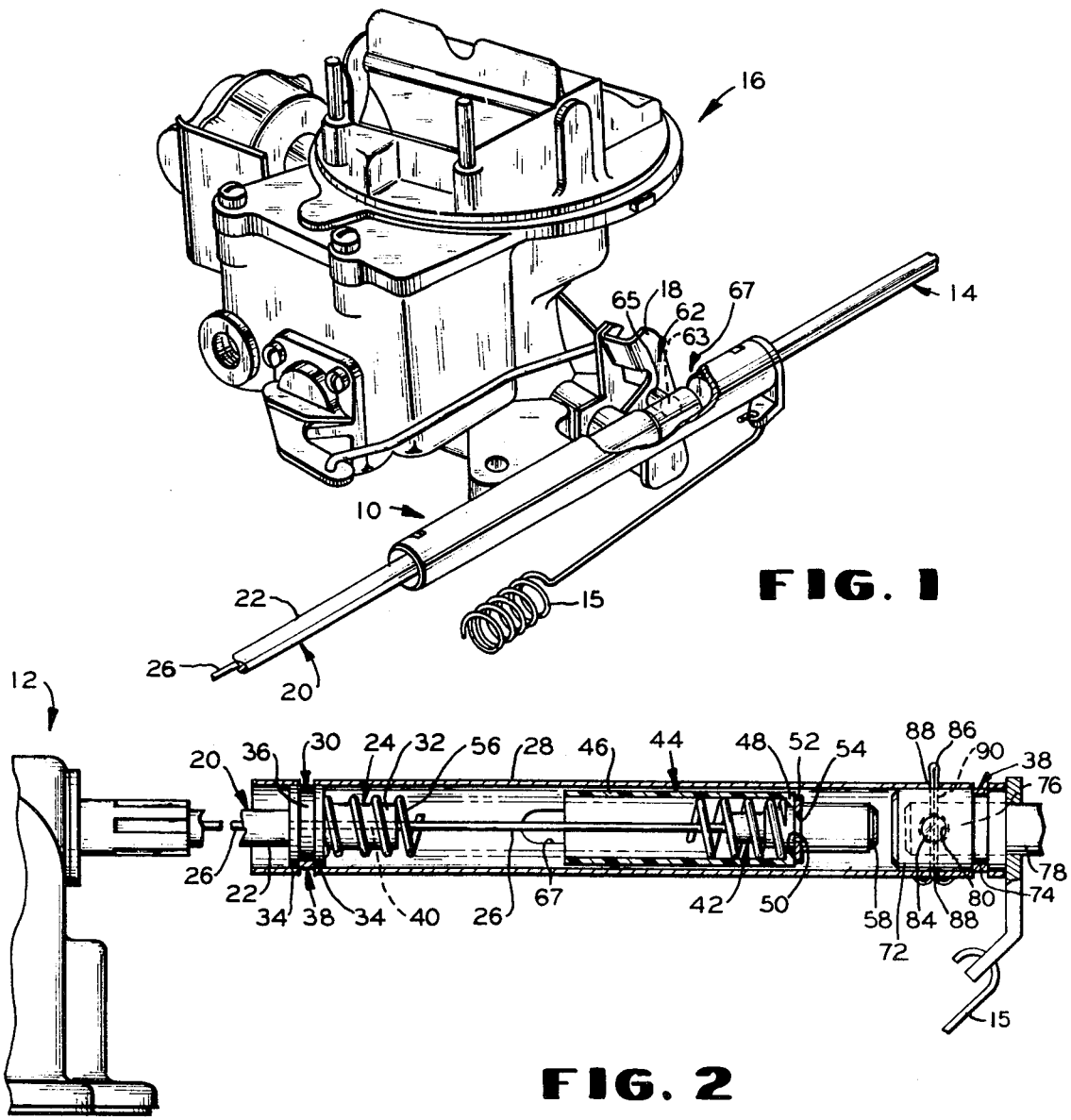
FIG. 1
FIG. 2
FIG. 3
INVENTOR.
DEAN L. PITCHFORD
BY 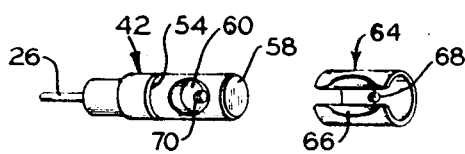
ATTORNEY

ANTI-OVERRIDE MECHANISM

This invention relates to a lost motion mechanism and is more specifically directed to an antioverride mechanism for a speed control unit. The invention provides a resilient lost motion connection between the speed control unit and pedal-operated linkage to prevent speed advancement of the engine setting by the throttle pedal once a set speed has been reached.

Lost motion connections disposed between a speed control unit and the throttle linkage of a vehicle are old and well known. However, heretofore the mechanisms which provided for lost motion required rigid mounting in the engine compartment or on the engine, itself, and/or spatial displacement from the carburetor throttle arm, thereby necessitating exact placement, specialized dimensioning of the connecting parts for each type of vehicular installation and mounting brackets of specific design for each model of vehicle. Furthermore, none of these previous units were developed for or contemplated the inherent advantage attendant to the mounting flexibility offered by the use of a Bowden cable connection between the speed control unit and the pedal-operated linkage, and, additionally, none of these mechanisms contemplate the utilization of a closed, encapsulating tubular construction for encompassing the operating parts of the lost motion mechanism.

Accordingly, it is an object of the present invention to provide an improved lost motion mechanism directly connected between a vehicle speed control unit and carburetor throttle plate arm.

It is an additional object of the invention to provide a lost motion mechanism usable with a Bowden type cable or the like.

It is a further object of the invention to provide a lost motion mechanism which is carried by the components which it controls and, therefore, requires no mounting brackets for its installation.

It is a further object of the invention to provide an antioverride means for a speed control unit wherein the antioverride means receives its suspension support from the carburetor throttle arm by being directly mounted thereto.

It is a still further object of this invention to provide an encapsulated lost motion mechanism wherein all the operating parts of the lost motion mechanism are contained in a tubular shell-like enclosure.

Other and further aspects of this invention and its details will be apparent to those skilled in the art from the following detailed description and the appendant drawings. It will, of course, be understood by reference to the accompanying drawings, that they are offered only as an illustration of a preferred embodiment of the invention and what is to be considered to be the best mode of applying the above principles.

In the preferred form of the invention an antioverride mechanism is provided for a speed control unit. A Bowden cable extends from the speed control unit and is attached, by its core, to a slidable element or means provided in a cylindrical shell of the antioverride mechanism. A ferrule is fixedly attached to the end of the rubber casing or sheath of the Bowden cable and is also fixedly attached within the cylindrical shell adjacent one end of the cylindrical shell by clinching of the tubular, cylindrical shell.

Disposed within the cylindrical shell between the slidable element and the ferrule of the antioverride mechanism is an expansion spring means which tends to urge the core of the Bowden cable away from the speed control unit. A spring guide means is disposed around the expansion spring means and is fixedly attached to the slidable element by a snap ring or the like so as to be disposed to extend longitudinally between the expansion spring means and the shell-like housing to guide the expansion spring as it expands and contracts. The slidable element includes a socketlike depression extending inwardly of its periphery for the insertion of a ball of a ball stud, that, in turn, is mounted with the throttle plate arm of the carburetor. A spring clip means, encompassing the slidable means, provides shaped, outwardly extending portions which resiliently hold the ball of the ball stud within the socketlike depression of the slidable means.

The end of the cylindrical housing remote from the speed control unit is closed by a bushing override sleeve that has an axially inwardly extending bore terminating short of the complete linear extent of the bushing override sleeve. The bushing override sleeve is fixed to the shell-like housing of the antioverride mechanism by clinching and, through the aforementioned bore, provides an easy connection for the throttle linkage by means of an inserted throttle rod. This rod may be inserted in the axially extending bore of the bushing override sleeve and held therein by a screw inserted through a threaded bore perpendicular to the first mentioned bore so that the screw impinges on and tightly holds the throttle rod within the axially extending bore in the bushing override sleeve. A cotter pin may also be inserted through the throttle rod and bushing override sleeve to more securely hold the throttle rod in its assembled position. Because of the disposition of the expansion spring means and its relative strength, the pull exerted on the carburetor throttle arm by the speed control unit, at set speed, is not opposed by the throttle rod since its movement (oppositely to the movement of the Bowden cable) merely compresses the expansion spring without a consequent movement of the carburetor throttle arm. On the other hand, if the speed control unit has not reached set speed then actuation of the throttle in a throttle advancing direction imposes a loading on the expansion spring which urges the slidable member in a throttle advancing direction and thereby the carburetor throttle plate.

In the drawings,

FIG. 1 is a view in perspective of the antioverride mechanism and its connection to a vehicle carburetor; and FIG. 2 is a plan view, partly in cross section, of the antioverride mechanism and its connection to the speed control unit; and FIG. 3 is a view in perspective and exploded of the slidable member and spring clip means of the instant invention.

Referring now more specifically to the drawings, an antioverride mechanism 10 is provided so as to be disposed between a speed control unit 12 and a throttle linkage 14 which includes a return spring 15 and is directly connected to a carburetor 16 through its throttle valve arm 18. The speed control unit 12 is any conventional unit which will impart a signalling motion to a Bowden cable 20 by exerting a tension pull thereon as the vehicle being controlled reaches a set speed. Such a speed control unit, for example, could be similar to the speed control unit disclosed in U.S. Pat. Application No. 733,502, filed on May 31, 1968, issued Dec. 15, 1970 as U.S. Pat. No. 3,547,216, and owned by a common assignee. Reference may be specifically had to this application, as exemplary, for a more thoroughgoing knowledge of the operation of the speed control unit 12.

The Bowden cable 20 extends into the antioverride mechanism 10 and has its flexible sheath 22, at the end of the Bowden cable 20 remote from the speed control unit 12, connected by bonding, swedging or the like to a metallic ferrule 24 of generally cylindrical shape so that a flexible core 26 of the Bowden cable 20 may freely slide through the sheath 22 and ferrule 24. The ferrule 24 is fixedly mounted within a shell-like housing 28 of the antioverride mechanism 10. This shell-like housing comprises a hollow, generally tubular element that forms the confines for the working elements of the antioverride mechanism 10 and, thus, conveniently encapsulates these elements to protect them, at least partially, from the harsh environment of the vehicular engine compartment.

Ferrule 24 includes an attaching portion 30 and a guide portion 32, with the attaching portion being formed by a pair of disklike protrusions 34, 34 separated by a smaller diameter extension 36 so that the disklike protrusions 34, 34 and extension 36 form a groove for the reception of a clinched portion 38 of the shell-like housing 28. The clinched portion 38 thereby holds the ferrule 24 securely within the confines of the shell-like housing 28. The guide portion 32 of ferrule 24 is disposed axially inwardly of the groove formed by disklike protrusions 34, 34 and extension 36 and is of slightly smaller diameter (the purpose of which will be explained later) than the extension 36 and projects axially inwardly in the shell-like housing 28 to provide an additional guide for the core 26. A bore 40, slightly larger in diameter than the core 26 of the Bowden cable extends axially through the ferrule 24 so that the entire ferrule, along with the guide portion 32, also serves as a guiding means for the core 26.

The core 26 of the Bowden cable 20 terminates axially inwardly of the ferrule 24, within the shell-like housing 28, and has attached fixedly to its terminating end, by swedging or the like, a slidable member or means 42 that is also generally cylindrical in shape. A spring guide means 44 of an easily formed, stable, low friction plastic comprising a hollow cylindrical portion 46 and a capped end portion 48 is disposed around the slidable member 42 and between it and the shell-like housing 28, with the outer diameter of the spring guide means 44 offering only a small clearance between it and the inner diameter of the shell-like housing 28 so as to permit guiding and sliding movement of the spring guide means 44 within the shell-like housing 28. A bore 50 in the end cap 48 permits positioning of the spring guide means 44 over the slidable member 42 intermediate the axial extent of the slidable member 42. A snap ring 52, disposed in a groove 54 extending around the cylindrical periphery of the slidable member 42 limits axial movement of the spring guide means 44 in one direction while movement of the spring guide means in other direction is limited by abutment of end cap portion 48 of the slidable member against an expansion spring means 56.

The spring means 56 is disposed between and engages the ferrule 24 and slidable member 42 to resiliently load the slidable member 42 and urge it axially away from the ferrule 24. As is specifically seen in Fig. 2, the spring means 56 abuts against the nearest adjacent disklike protrusion 34 of the ferrule 24 and extends within the hollow cylindrical portion 46 of spring guide means 44 so as to abut against the end cap 48 of the spring guide means 44. The spring means 56 thereby contracts and expands as the slidable member 42 and the attached spring guide means 44 move axially within the shell-like housing 28 with guiding of the spring means 56 at its outer end adjacent speed control unit 12 being accomplished by the smaller diameter guide portion 32 of ferrule 24.

A stem portion 58 of slidable member 42 is disposed axially to the right of annularly extending groove 54 and includes a depression 60, cylindrical in shape, and provided to form a ball socket seat. A ball stud 62 having a ball 63 is attached to the carburetor throttle arm 18 by means of its stud portion 65 and a nut or the like (not shown). The ball 63 extends into the depression 60 through an elongated axially extending slot 67 in shell-like housing 28 so as to connect the carburetor throttle arm 18 to the antioverride mechanism 10. In order to insure a positively held and easily assembled connection of these elements, a spring clip 64 having a split cylindrical shape is snapped on the stem portion 58 of the slidable member 42. At the location of the split of the spring clip 64, a pair of opposed, confronting and outwardly extending integral clamping elements 66, 66 are provided. These clamping elements receive and clamp therebetween the outer periphery of the ball 63 but at the same time permit the stud portion 65 of the ball stud to pass therebetween. The spring clip 64 is, additionally, provided with a radially inwardly projecting nipple 68 disposed directly opposite the split so as to engage in a small bore 70 in slidable member 42. The bore 70 is formed directly opposite to depression 60 in the slidable member and is axially centered therewith so as to align the spring clip 64 relative to the depression 60 and ball stud 62 and arrest the spring clip 64 from axial movement along the stem portion 58.

The far end (the end remote from the speed control unit 12) of the shell-like housing 28 is closed by a bushing 72 of generally cylindrical shape. This bushing includes a groove 74 which extends annularly therearound to provide an indented portion so that the shell-like housing 28 may be securely clinched to the bushing 72 at this location to fix the bushing relative to the shell-like housing. A blind bore 76, centered relative to the bushing 72, extends axially inwardly into the bushing for insertion of a throttle rod 78 of the throttle linkage 14. A threaded bore 80 formed in the bushing 72 and mating with a round aperture (not shown) of slightly larger diameter in the shell-like housing 28, extends perpendicular to and intersects the blind bore 76. Threaded bore 80 receives an Allen screw 84 or the like which may be tightened down on throttle rod 78 to connect the throttle linkage 14 to the antioverride mechanisms.

Since the connection afforded by the Allen screw 84 is not always positive enough to insure that the throttle rod 78 is held within the bushing 72, a cotter pin 86 may be inserted through a pair of oppositely disposed round apertures 88 in the shell-like housing 28 by drilling a bore 90 through the bushing 72. Such additional fastening means absolutely insures that the throttle rod 78 is fixed relative to the bushing 72 and thereby the shell-like housing 28 of the antioverride mechanism 10.

The operation of the antioverride mechanism 10 is as follows: On movement of the throttle linkage 14 to the right (i.e., advancement of the throttle), the housing 28, the sheath 22 and the core 26 are advanced with it thereby causing the ball stud 62 to rotate the throttle valve arm 18. The spring 56 prevents relative movement between the core 26 and the housing 28. This mode of operation continues until the set speed, determined by the speed control unit 12, is reached. At set speed, the tension imposed by the speed control unit 12 on the core 26 is sufficient to overcome (i.e., compress) the expansion spring 56. Continued movement of the throttle linkage 14 to the right will cause a momentary increase in speed which will be sensed by the speed control unit 12. The speed control unit 12 reacting to this increase in speed will cause the core 26 to be retracted (i.e., moved to the left) from the housing 28 and against the compressive force of the expansion spring 56. The distance of travel of the spring guide 44 relative to the housing 28, and the lineal extent of the slot 67 are sufficiently greater than the total travel of the throttle linkage 14, to thereby assure that movement of the throttle linkage 14 over its full range of travel will be insufficient to override the speed control unit 12 acting by means of retraction of the core 26.

I claim:

1. An antioverride mechanism for a speed control unit that is responsive to the road speed of a vehicle having a throttle pedal linkage and a carburetor with a throttle arm comprising; (a) a cable having a flexible sheath and a flexible core within said sheath and freely slidable relative thereto, said sheath having one end adapted to be secured to said speed control unit, said core having one end adapted to be secured to the speed control unit and movable thereby relative to said sheath; (b) a tubular housing having a first end secured to the other end of said sheath and being adapted to receive said core; (c) a slidable member positioned within said tubular housing for sliding movement relative thereto, the other end of said core being secured to said slidable member; (d) resilient means for resiliently biasing said slidable member away from said first end of said tubular housing, the resilient force imposed by said resilient means being insufficient to restrain movement of said core by said speed control unit relative to said sheath; (e) ball stud means for pivotally securing said slidable member to said throttle arm; and (f) linkage means for securing said housing to said throttle pedal linkage whereby said housing will move in response to movement of said throttle pedal linkage.

2. The antioverride mechanism of claim 1, wherein said ball stud means includes a longitudinally extending slot in said tubular housing and a ball stud secured to said slidable member and extending through said slot.